(12) United States Patent
Ptasinski et al.

(10) Patent No.: US 9,784,617 B1
(45) Date of Patent: Oct. 10, 2017

(54) TUNABLE ULTRA-COMPACT FRESNEL ZONE PLATE SPECTROMETER

(71) Applicants: Joanna N. Ptasinski, San Diego, CA (US); Stephen D. Russell, San Diego, CA (US)

(72) Inventors: Joanna N. Ptasinski, San Diego, CA (US); Stephen D. Russell, San Diego, CA (US)

(73) Assignee: United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/421,486

(22) Filed: Feb. 1, 2017

(51) Int. Cl.
  *G01J 5/02* (2006.01)
  *G01J 3/18* (2006.01)
  *G01J 3/02* (2006.01)
  *G01J 3/28* (2006.01)
  *G02B 5/18* (2006.01)

(52) U.S. Cl.
  CPC ............ *G01J 3/1809* (2013.01); *G01J 3/0237* (2013.01); *G01J 3/0256* (2013.01); *G01J 3/2803* (2013.01); *G02B 5/1828* (2013.01); *G02B 5/1876* (2013.01); *G01J 2003/2813* (2013.01)

(58) Field of Classification Search
  CPC ........ G01J 5/061; G01J 5/08; G01N 21/3504; G01N 21/3563; G01N 21/39
  See application file for complete search history.

(56) References Cited

U.S. PATENT DOCUMENTS

| 5,296,724 | A | * | 3/1994 | Ogata | .................. G02B 6/4204 257/680 |
| 2012/0267549 | A1 | * | 10/2012 | Crozier | ............. B01L 3/502715 250/432 R |
| 2016/0025897 | A1 | * | 1/2016 | Twitchen | ................ C30B 29/04 359/356 |

OTHER PUBLICATIONS

Linear Thermal Expansion Coefficients of Metals and Alloys, Table 17-1, Laser and Optics User's Manual, Chapter 17, Material Expansion Coefficients, Agilent Technologies (2002).

* cited by examiner

*Primary Examiner* — David Porta
*Assistant Examiner* — Mamadou Faye
(74) *Attorney, Agent, or Firm* — SSC Pacific Patent Office; Arthur K. Samora; Kyle Eppele

(57) ABSTRACT

A tunable ultra-compact spectrometer and methods for spectrometry therefor can include a single pixel and a Fresnel zone plate having a focal length at a first temperature $T_1$ and a first wavelength $\lambda_1$, and a focal point. The pixel can be twenty micrometers square and can be placed at a distance from the pixel that equal to the focal length so that the focal point is at the pixel. The Fresnel zone plate can be made of a material that causes the same focal point at the pixel at $T_2$, but at a different wavelength $\lambda_2$ than wavelength $\lambda_1$. A heat source can selectively add heat to the Fresnel zone plate to cause a second temperature $T_2$. Exemplary materials for the Fresnel zone plate can be quartz for visible wavelengths, silicon for infrared wavelength, or other materials, according to the $\lambda(s)$ of interest.

14 Claims, 5 Drawing Sheets

US 9,784,617 B1

TUNABLE ULTRA-COMPACT FRESNEL ZONE PLATE SPECTROMETER

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103643.

FIELD OF THE INVENTION

The present invention pertains generally to spectrometers. More specifically, this invention pertains to ultra-compact spectrometers. The invention is particularly, but not exclusively, useful as an ultra-compact spectrometer that can incorporate a Fresnel zone plate and a single pixel to function as the spectrometer.

BACKGROUND OF THE INVENTION

A spectrometer is a device to measure the wavelength or frequency components of the electromagnetic spectrum. Most optical spectrometers use a diffraction grating or a prism in order to disperse light, where the spectrum of light is separated in space by wavelength. Spectrometers are frequently utilized for environmental or chemical analysis, fluorescence or Raman measurements.

Fresnel zone plates are circular diffraction gratings with radially increasing line density. The radially symmetric rings alternate between opaque and transparent zones. The zones can be spaced so that the diffracted light constructively interferes at the desired focus, creating an image there. Fresnel zone plates behave like a circular lens with focusing behavior which approximates that described by the thin lens formula $1/p+1/q=1/f$, where p is the object distance, q is the image distance, and f is the focal length. The main difference between a lens and a zone plate is that the zone plate has different diffraction orders and therefore several focal spots, as opposed to just one focal spot (focal point) for a lens.

In view of the above, it can be an object of the present invention to provide an ultra-compact spectrometer that can fit on a single pixel. Yet another object of the present invention can be to provide an ultra-compact spectrometer that can take advantage of thermal expansion properties of a Fresnel zone plate to provide an indication of a presence of a wavelength, using a single pixel. Still another object of the present invention can be to provide a thermally tunable chip scale, ultra-compact, 20 μm diameter or less spectrometer. Another object of the present invention can be to provide an ultra-compact spectrometer that can be relatively easy to manufacture and that can be used in a cost-effective manner.

SUMMARY OF THE INVENTION

A tunable ultra-compact spectrometer and methods for spectrometry therefor according to several embodiments of the present invention can include a single pixel and a Fresnel zone plate. The Fresnel zone plate can have a focal length that focuses radiation at a first wavelength $\lambda_1$ and a first temperature $T_1$ at a focal point. The pixel can be square and can have dimensions of less than twenty micrometers (L=20 μm) by twenty micrometers (L=20 μm). The Fresnel zone plate can be placed at a distance from the pixel that can be equal to the focal length so that the focal point is at the pixel.

The spectrometer and methods can further incorporate a heat source for selectively adding heat to the Fresnel zone plate to a second temperature $T_2=T_1+\Delta T$. The Fresnel zone plate can be made of a material having thermal expansion properties, which can cause the same focal point at the same pixel at $T_2$, but at a different wavelength $\lambda_2$ than wavelength $\lambda_1$. If $\lambda_1$ and $\lambda_2$ are optical wavelengths, the Fresnel zone plate can be made of glass, quartz, or sapphire. If $\lambda_1$ and said $\lambda_2$ are infrared wavelengths, the Fresnel zone plate can be made of silicon, germanium and semiconductor alloys. Other materials could be used, depending on the $\lambda(s)$ of interest.

The heat source can further add heat to the Fresnel zone plate at increments of $\Delta T$, to establish a plurality of Fresnel zone plate temperatures $T_2=T_1+\Delta T$ through $T_n=T_1+(n-1)\Delta T$. The plurality of temperatures $T_1$ through $T_n$ can establish a corresponding plurality of wavelengths $\lambda_1$ through $\lambda_n$, at the same pixel. In several alternative embodiments, a plurality of pixels can be arranged as a two-dimensional array, and a plurality of Fresnel zone plates of different materials can be provided, but at the same focal length, with each Fresnel zone plates corresponding to one of the pixels and establishing a plurality of corresponding focal points on different pixels at different wavelengths $\lambda_n$ of interest, but at the same focal length.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, a pixel can be thought of as a device to measure the wavelength or frequency components of the electromagnetic spectrum. Most optical spectrometers use a diffraction grating or a prism in order to disperse light, where the spectrum of light is separated in space by wavelength. Spectrometers are frequently utilized for environmental or chemical analysis, fluorescence or Raman measurements.

Figure 1:
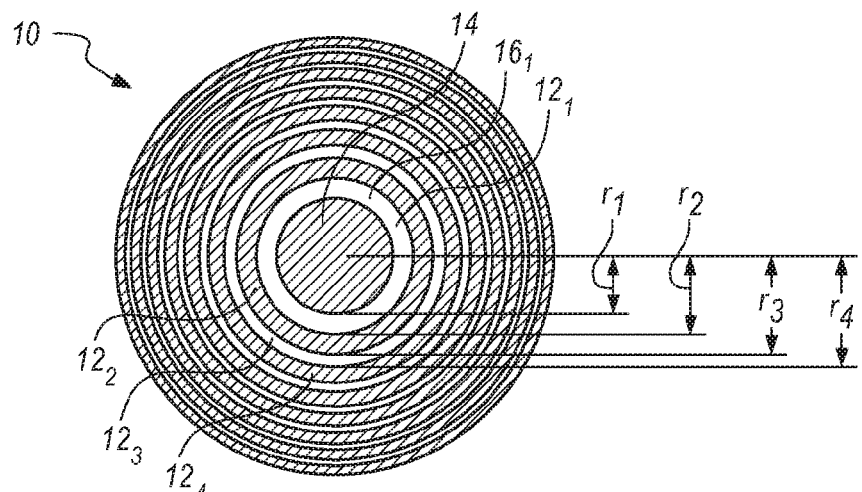
FIG. 1 is a top plan view of a prior art Fresnel zone plate.

Referring initially to FIG. 1, a prior art Fresnel zone plate is shown and is generally designated with reference character 10. As shown in FIG. 1, prior art Fresnel zone plates 10 can have circular diffraction gratings with radially increasing line density. The radially symmetric rings 12 (rings $12_1$, $12_2$, $12_3$ and $12_4$ are shown in FIG. 1) can alternate between opaque zones 14 (cross-hatched in FIG. 1) and transparent zones $16_i$ (zone $16_1$ is shown in FIG. 1). The zones 14, 16 can be spaced so that the diffracted light constructively interferes at the desired focus, creating an image there. Thus, Fresnel zone plates can behave like a circular lens with focusing behavior which approximates that described by the thin lens formula in Equation (1):

$$1/p+1/q=1/f, \quad (1)$$

where p is an object distance, q is an image distance, and f is a focal length. The main difference between a lens and a zone plate is that the zone plate can have different diffraction orders and therefore several focal spots.

The Fresnel zone plate focal length "f" can be given by Equation (2):

$$f = \frac{r_n^2}{n\lambda} \quad (2)$$

Where $r_n$ is the radius of the outermost ring, n is the number of rings 12 in FIG. 1, and $\lambda$ is the wavelength. This result shows that each source wavelength has a different focal length. Furthermore, $\lambda$ and f are inversely related; for a given zone plate, long wavelengths will focus more quickly than short wavelengths. The zone plate radius can be directly related to the zone plate resolution "w", Equation (3):

$$w = \frac{\lambda f}{2r_n} \quad (3)$$

The number of zones n in Equation (2) above can have an inverse square relation to the resolution; therefore, doubling the resolution of a zone plate while preserving its focal length requires a quadrupling of the number of zones. This can be described by Equation (4):

$$n = \frac{\lambda f}{4w^2} \quad (4)$$

Figure 2:
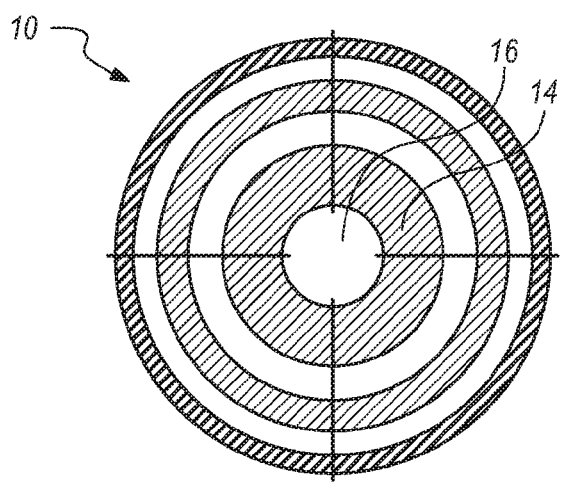
FIG. 2 is a top plan diagram of an expandable Fresnel zone plate that can be made of a material with known thermal expansion properties, prior to expansion.
Figure 3:
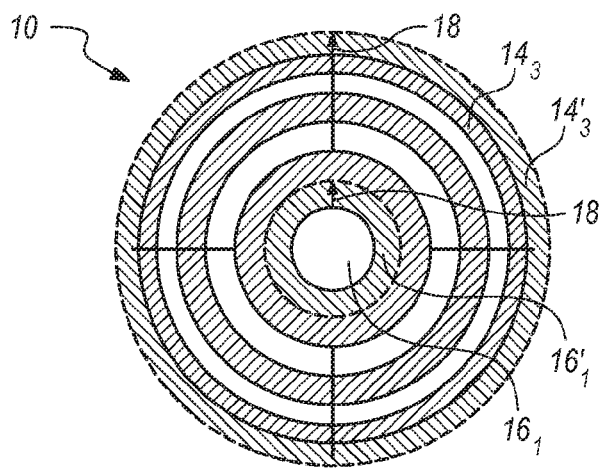
FIG. 3 is a top plan diagram of the same Fresnel zone plate of FIG. 2, after thermal expansion.

Referring now to FIGS. 2 and 3, FIG. 2 illustrates a tunable Fresnel zone plate, which can be made of metal, a metal alloy, or a material with a large thermal expansion coefficient. The tunable Fresnel zone plate can takes advantage of the thermal expansion properties that the material that the Fresnel zone plate can be is made of. For this specification, a Fresnel zone plate can be thought of as tunable when it is constructed with known dimensions, and with a known thermal expansion coefficient, so that the addition of a predetermined amount of heat will cause the Fresnel zone plate 10 to change dimensions by a known amount, to "tune", or cause a refocusing of radiation at different focal lengths f, or at the same focal length f but at a different wavelength $\lambda$.

Referring now to FIG. 3, FIG. 3 is the same Fresnel zone plate 10 of FIG. 2 but after heat addition and thermal expansion. The arrow 18 can indicate the direction of thermal expansion. For example, an as shown in FIG. 3, transparent zone $16_1$ can expand radially outward into transparent zone $16_1$', and opaque zone $14_3$ can expand radially outward into opaque zone $14_3$'. In general, linear thermal expansion of materials can be governed by Equation (5):

$$\Delta T = L \cdot \Delta T \cdot \alpha \quad (5)$$

Where $\Delta T$ is the change in temperature (in degrees Celsius), L is the length of the material, and a is the linear thermal expansion coefficient of the material. Table 1 below is an example of a list of large thermal expansion coefficients, as known in the prior art (taken from Chapter 17, Laser and Optics User's Manual Agilent, ©2002). It should be appreciated, however, that other references could be used, and lists and tabulations of thermal expansion coefficients are well known in the prior art, and can be found for reference and incorporation into the present invention without undue experimentation. Generally, the greater the thermal expansion coefficient $\alpha$, the more responsive the Fresnel zone plate 10 will be to the addition/removal of heat, in terms of expansion and contraction.

TABLE 1

Pure Metals And Their Linear Thermal Expansion Coefficient

| Alloys | Coefficient of Expension | |
|---|---|---|
| PURE METALS | ppm/° C. | ppm/° F. |
| Beryllium | 11.6 | 6.5 |
| Cadmium | 29.8 | 16.6 |
| Calcium | 22.3 | 12.4 |
| Chromium | 6.2 | 3.5 |
| Cobalt | 13.8 | 7.7 |
| Gold | 14.2 | 7.9 |
| Iridium | 6.8 | 3.8 |
| Lithium | 56.0 | 31.0 |
| Manganese | 22.0 | 12.3 |
| Palladium | 11.76 | 6.6 |
| Platinum | 8.9 | 5.0 |
| Rhenium | 6.7 | 3.7 |
| Rhodium | 8.3 | 4.8 |
| Ruthenium | 9.1 | 5.1 |
| Silicon | 5.0 | 2.8 |
| Silver | 19.68 | 11.0 |
| Tungsten | 4.6 | 2.7 |
| Vanadium | 8.3 | 4.6 |
| Zirconium | 5.85 | 3.3 |

Tuning the Fresnel zone plate radius by thermal expansion can have an effect on the focal length as well as the wavelength which comes into focus, Equation (6):

$$f = \frac{r_n^2}{n\lambda} \quad (6)$$

In view of the above, it can be appreciated that the tunable Fresnel zone plate may be formed on a substrate with one or more heating and/or cooling elements, and if desired monolithically integrated control circuitry, to effect a desired focal length by changes in the temperature to exploit the variable coefficients of expansion and thus form a tunable focusing lens.

Figure 4:
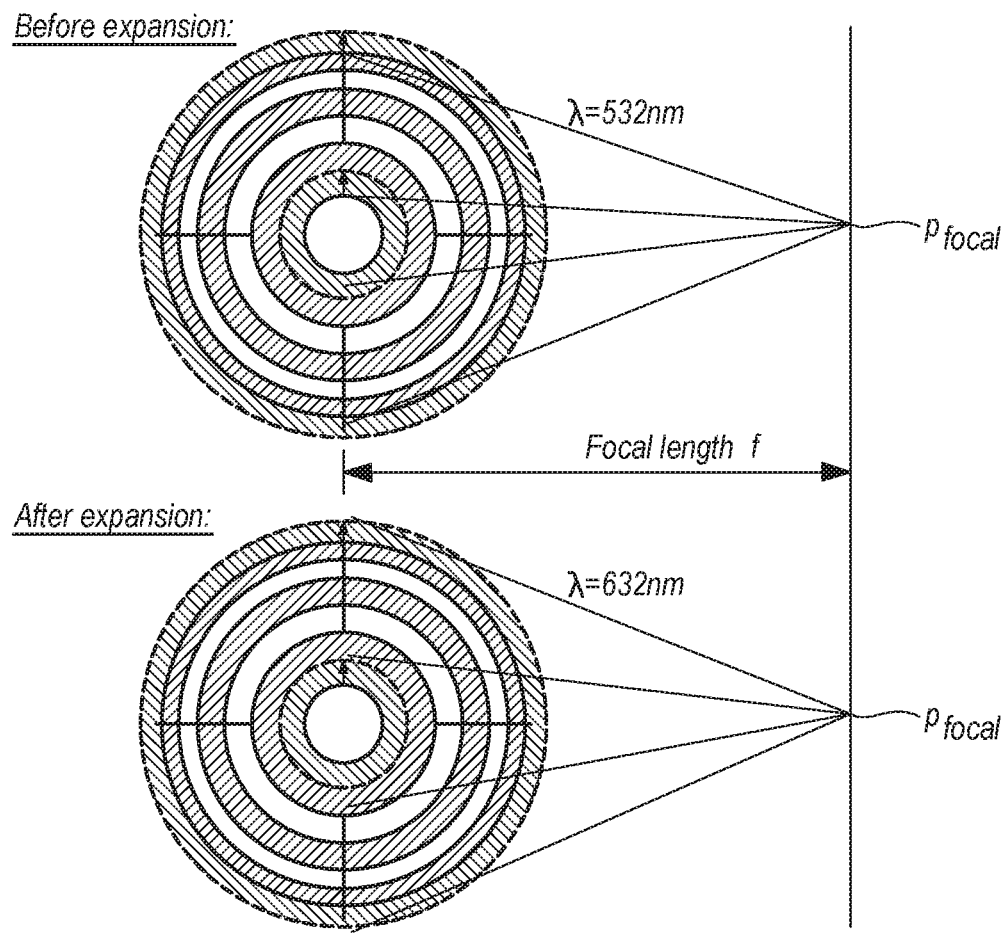
FIG. 4 is a diagram of the Fresnel zone plate of FIG. 3, which illustrates the effects of the expansion at the wavelength being focused for a given focal length.

Referring now to FIG. 4, the effects of a heating an expandable Fresnel zone plate while referencing the same focal length f and same focal point $p_{focal}$ can be shown. As shown in FIG. 4 prior to expansion, the tunable Fresnel zone plate 10 can focus green light 17 ($\lambda$=532 nm) at focal point $p_{focal}$ and at a distance equal to focal length f when the plate 10 is heated to temperature T1. An amount of heat equal to $\Delta$T can then be added to tune Fresnel zone plate 10, to increase the temperature to T+$\Delta$T. After expansion, the tunable Fresnel zone plate 10 can focus red light 19 ($\lambda$=632 nm) at the same distance (focal length f and focal point $p_{focal}$).

Figure 5:
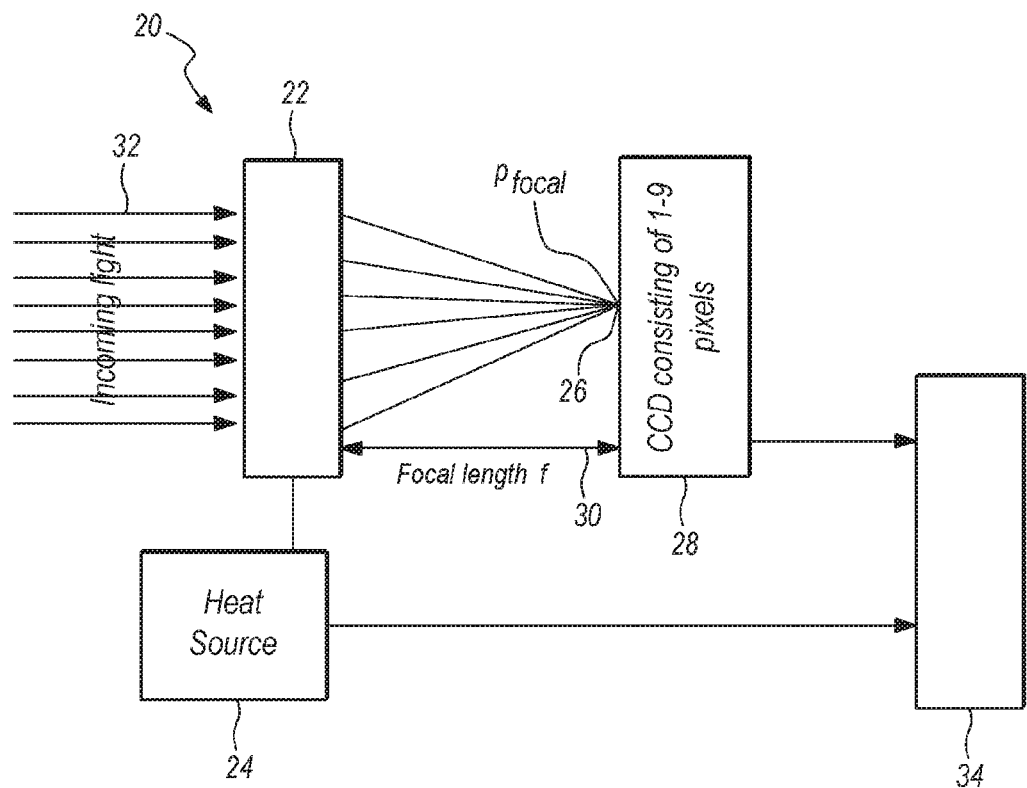
FIG. 5 is a block diagram of the ultra-compact spectrometer of the present invention according to several embodiments.

Referring now to FIG. 5, the ultra-compact spectrometer of the present invention according to several embodiments can be shown, and can be designated with reference character 20. As shown, spectrometer 20 can include a Fresnel zone plate 22 and a heat source 24 in thermal communication with the Fresnel zone plate 22. Spectrometer can further include at least one pixel 26 within a pixel planar array 28. Pixel 26/array 28 can be spaced apart from Fresnel zone plate 12 by a focal length 30.

As incoming radiation 32 impinges on zone plate 22, Fresnel zone plate 22 can function as a lens and can focus the radiation onto pixel 26. If the Fresnel zone plate is made of a material is prone to thermal expansion, and the expansion coefficient is known, this property can be taken advantage of to establish a tunable Fresnel zone plate 22. The tunable Fresnel zone plate can then focus the radiation 32 at a single focal point $p_{focal}$. Heat can be selectively added to (or removed from) Fresnel zone plate 12 by heat source 14 in response to non-transitory written instructions incorporated into processor 34. The amount of heat that is selectively added can cause the wavelength of light that is focused at focal point to change. Pixel 26/array 28 can provide an indication of the presence (or not) of radiation 32 on pixel 26 to processor 34. Processor can receive an input the indication from pixel 26 and temperature T of Fresnel zone plate to provide an output indication of the presence of a particular wavelength $\lambda$ in the radiation 32, to thereby function as a spectrometer.

From the above, it can be seen that the ultra-compact spectrometer 20 and the tunable Fresnel zone plate 22 can be tuned over a wide range of wavelengths for spectroscopy. The spectrometer 20 can function with only a single pixel 26 (a 20 $\mu$m×20 $\mu$m square) could be used for readout, and thus can offer an extreme reduction in the size of the spectrometer. Both devices may be formed with materials compatible with microfabrication techniques and thus may be batch fabricated and the economy of scale will offer reduced cost per device. The symmetry of the device minimizes misalignment with linearly polarized light.

Still further, choice of materials compatible with microfabrication techniques will allow formation of arrays of tunable Fresnel zone plates of different materials. Each Fresnel zone plate can be oriented to a corresponding pixels 26 in an array 28, but spaced potentially with independently controlled responses, to provide a simultaneously indication of a plurality of wavelengths of interest. In this manner, differential temperature measurement may also be used by have paired Fresnel zone plates constructed with materials of differing thermal expansion coefficients. The tunable ultra-compact spectrometer may use alternative 2D arrayed sensors as opposed to a CCD array. Alternate detectors may, for example, include low cost photodiode arrays or active-pixel CMOS sensors. Still further, the thermally tunable focusing Fresnel zone plate or the ultra-compact spectrometer 20 of the present invention can both be used as a temperature sensor due to their thermal response. In this application, temperature stabilization may be used to establish a consistent baseline temperature and then changes to this baseline are measured by external sensors.

Figure 6:
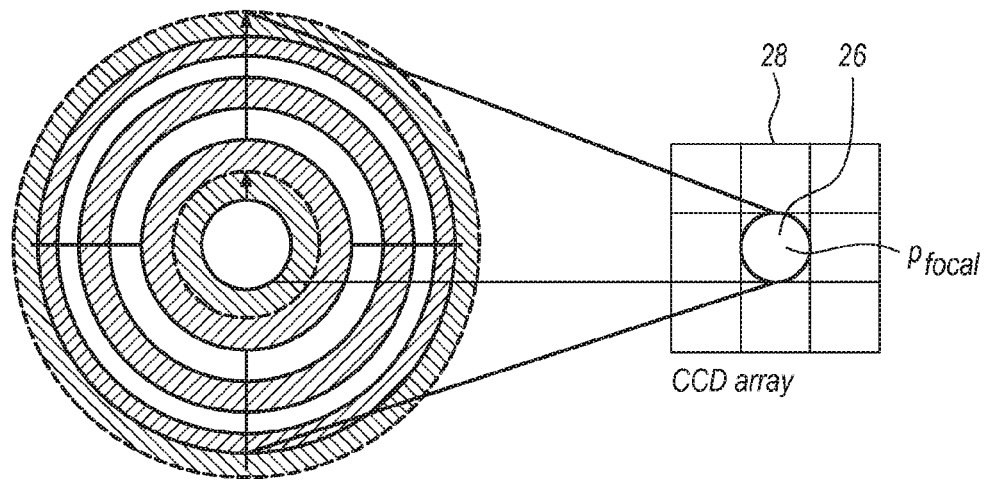
FIG. 6 is a schematic which shows the effect of the device of FIG. 5 on the wavelength of light focused a pixel of the pixel plane.
Figure 7:
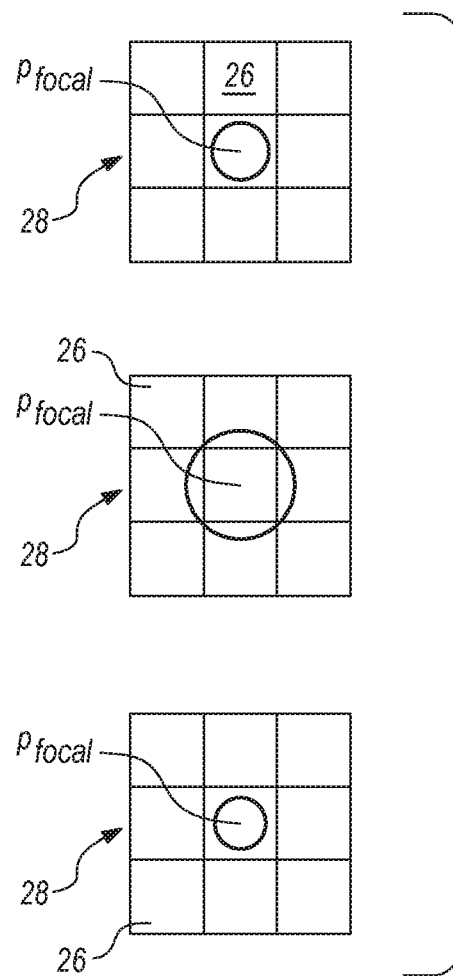
FIG. 7 is the same as FIG. 6 a plan view of the pixel plane during operation of the device, as heat is added to the Fresnel zone plate of the spectrometer of FIG. 5; and, FIG. 8 is a block diagram that is illustrative of steps that can be taken to accomplish the methods of the present invention according to several embodiments.

Referring now to FIGS. 6-7, an example of the above can be shown. As shown, broadband light can be directed onto the thermally tunable spectrometer 26 in array 28 for spectrometer 20. The spectrometer can be set at temperature T. At temperature T, $\lambda$=580 nm light 36 can be tightly focused into a spot 38 that is within a single pixel 26 in the array 28. The spectrometer temperature, the light beam spot size, the light spot intensity and the corresponding wavelength can be recorded.

The temperature can then be increased to T+$\lambda$T. Once this occurs, the Fresnel zone plate 22 can function to refocus light so that the spot of light now covers several pixels. The spectrometer temperature, the spot intensity and beam spot size can be recorded, and provided as an input to processor 34, along with the temperature, the focal length and the materials of construction, dimensions and thermal expansion properties of the Fresnel zone plate 22. If light intensity on pixel 26 is below a certain level, light at the particular temperature T+$\Delta$T can be deemed to be not present.

Next, the temperature T can be increased by a second increment of $\lambda$T to T+2$\Delta$T. The second increase of temperature can result in light being tightly focused (again) onto a single pixel 28, but at a different wavelength. The focused light wavelength in FIG. 7 can be $\lambda$=632 nm. The updated spectrometer temperature, the light beam spot size, the spot intensity and the corresponding wavelength can be recorded, and the broadband light spectrum (output wavelength $\lambda$) as a function of intensity can be plotted out to yield an output spectroscopy.

Figure 8:
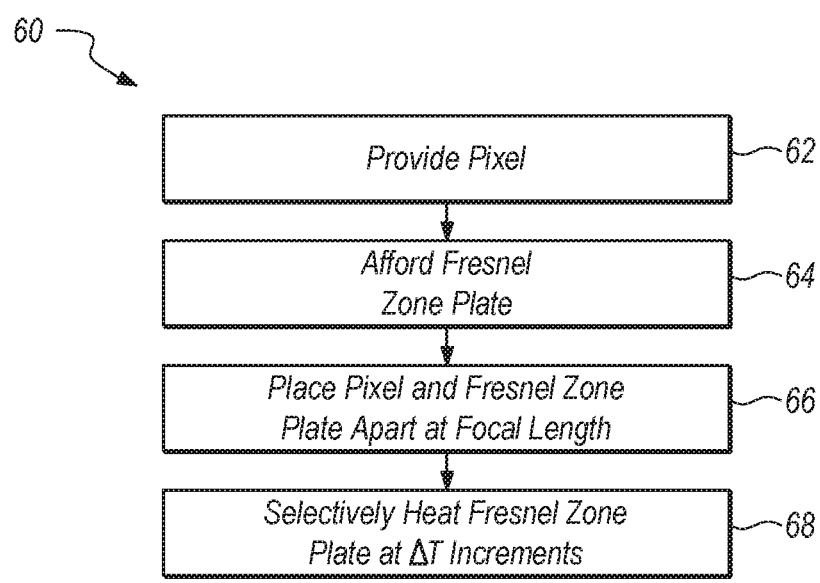

Referring now to FIG. 8, a block diagram 60 is shown, which can be used to illustrate steps that can be taken the practice the methods of the present invention according to several embodiments. As shown method 60 can include the initial step 62 of providing a pixel 26 (or a pixel 26 in a pixel array 28) and affording a Fresnel zone plate 22 having known dimensions and known thermal expansion coefficient $\alpha$, as shown by block 64. The methods 60 can further include the step 66 of placing the pixel 28 and the Fresnel zone plate apart from each other at a distance equal to focal length f. As shown by FIG. 8, the methods can further include the step of selectively heating the Fresnel zone plate 22. In some embodiments, the heating can be accomplished in increments of $\Delta$T.

The heating step can cause thermal expansion of the Fresnel zone plate 22, as described above. The thermal expansion due to heating can further cause refocusing of radiation at different wavelengths $\lambda_i$ according to the temperature of the Fresnel zone plate 22, which will cause the pixel to register (or not) the presence of light (or not), or the degree of intensify of light at the focal point at pixel 26, which can be indicative of the presence of a particular wavelength in the radiation 32.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A spectrometer comprising:
    a pixel;
    a Fresnel zone plate having a focal length at a first temperature $T_1$ and a first wavelength $\lambda_1$, and a focal point; said Fresnel being placed at a distance from said pixel equal to said focal length so that said focal point is at said pixel;
    a heat source for selectively adding heat to said Fresnel zone plate to cause a second temperature $T_2$; and,
    said Fresnel zone plate being made of a material that causes the same said focal point at said pixel at said $T_2$, but at a different wavelength $\lambda_2$ than said wavelength $\lambda_1$.

2. The spectrometer of claim 1 wherein said pixel is square and has dimensions of less than twenty micrometers (L=20 µm) by twenty micrometers (L=20 µm).

3. The spectrometer of claim 1, wherein said heat source adds heat at increments of $\Delta T$, to establish a plurality of temperatures $T_2=T_1+\Delta T$ through $T_n=T_1+(n-1)\Delta T$.

4. The spectrometer of claim 3, wherein said plurality of temperatures $T_1$ through $T_n$ establishes a corresponding plurality of wavelengths $\lambda_1$ through $\lambda_n'$.

5. The spectrometer of claim 1, wherein said $\lambda_1$ and said $\lambda_2$ are optical wavelengths and said Fresnel zone plate is selected from the group consisting of glass, quartz, and sapphire.

6. The spectrometer of claim 1, wherein said $\lambda_1$ and said $\lambda_2$ are infrared wavelengths and said Fresnel zone plate is selected from the group consisting of silicon, germanium and semiconductor alloys.

7. The spectrometer of claim 1, further comprising:
    a plurality of said pixels arranged as a two-dimensional array;
    a plurality of said Fresnel zone plates, each of said plurality of Fresnel zone plates corresponding to one of said plurality of pixels and establishing a corresponding focal point on said pixel at a wavelength $\lambda_n$ and,
    said Fresnel zone plates having rings that are sized to establish a focal point on said pixels, but at a different temperature $T_n$.

8. A method for accomplishing spectrometry, comprising the steps of:
    providing a pixel;
    affording a Fresnel zone plate having a focal length at a first temperature $T_1$ and a first wavelength $\lambda_1$, and a focal point
    placing said Fresnel zone plate at a distance from said pixel equal to said focal length, so that said focal point is at said pixel;
    selectively heating said Fresnel zone plate to cause a second temperature $T_2$; and,
    said heating step being accomplished with a Fresnel zone plate that is made of a material that causes the same said focal point at said pixel at said $T_2$, but at a different wavelength $\lambda_2$ than said wavelength $\lambda_1$.

9. The method of claim 8 wherein said pixel ins said providing step is square and has dimensions of less than twenty micrometers (L=20 µm) by twenty micrometers (L=20 µm).

10. The method of claim 8, wherein said selecting heating step is accomplished at increments of $\Delta T$, to establish a plurality of temperatures $T_2=T_1+\Delta T$ through $T_n=T_1+(n-1)\Delta T$.

11. The method of claim 10, wherein said plurality of temperatures $T_1$ through $T_n$ establishes a corresponding plurality of wavelengths $\lambda_1$ through $\lambda_n'$.

12. The method of claim 8, wherein said $\lambda_1$ and said $\lambda_2$ are optical wavelengths and said Fresnel zone plate is selected from the group consisting of glass, quartz, and sapphire.

13. The spectrometer of claim 8, wherein said $\lambda_1$ and said $\lambda_2$ are infrared wavelengths and said Fresnel zone plate is selected from the group consisting of silicon, germanium and semiconductor alloys.

14. The method of claim 8, wherein:
    said providing step is accomplished with a plurality of said pixels arranged as a two-dimensional array;
    said placing step is accomplished with a plurality of said Fresnel zone plates, so that each of said plurality of Fresnel zone plates corresponds to one of said plurality of pixels, and so that each said Fresnel zone establishes a corresponding focal point on said pixel at a corresponding wavelength $\lambda_n$; and,
    wherein each of said Fresnel zone plates has rings that are sized to establish a focal point on said corresponding pixel, but at a different temperature $T_n$ than each other said Fresnel zone plates.

* * * * *